United States Patent Office 3,787,564
Patented Jan. 22, 1974

3,787,564

PROCESS FOR PRODUCING FERROMAGNETIC CHROMIUM DIOXIDE

Tatsuji Kitamoto, Mahito Shimizu, and Goro Akashi, Kanagawa, Japan, assignors to Fuji Photo Co., Ltd., Kanagawa, Japan No Drawing. Filed Dec. 14, 1971, Ser. No. 207,995
Claims priority, application Japan, Dec. 14, 1970, 45/110,489
Int. Cl. C01g *37/02;* B01j *1/00*
U.S. Cl. 423—607 8 Claims

ABSTRACT OF THE DISCLOSURE

Ferromagnetic chromium dioxide is produced without adverse affects on its characteristics by using a reaction vessel at least the inner wall of which is chromium.

BACKGROUND OF THE INVENTION

(1) Field of the invention

This invention relates to improved processes for producing ferromagnetic chromium dioxide.

(2) Description of the prior art

Ferromagnetic chromium dioxide is a ferromagnetic material having a rutile-type crystal structure and a Curie point of 116° C. The addition of tin tellurium, antimony, platinum, and the like materials to chromium dioxide provides acicular particles with a size of about 1 to 0.3$\mu$ whose coercive force has been increased to about 400 oersteds. Such products are known to the art. When a dispersion of ferromagnetic chromium dioxide in an organic binder is coated on a polyester film, subjected to magnetic field orientation, and dried to form a magnetic tape, the ratio of the residual magnetic flux density to the saturated magnetic flux density reaches as high as 90%. On account of these properties, ferromagnetic chromium dioxide has attracted much attention in recent years for use in the production of magnetic tape, especially magnetic tape of high recording density.

Stable ferromagnetic chromium dioxide is difficult to produce at normal atmospheric pressure. Accordingly, it is generally produced under conditions of high temperature and pressure, e.g., 300 to 500° C. and greater than about 50 atmospheres. Chromium dioxide (tetravalent chromium) can be obtained by the thermal decomposition of chromic anhydride (hexavalent chromium) or by the oxidation of chromium hydroxide or chromium oxide (divalent or trivalent).

In the production of ferromagnetic chromium dioxide water is generally added to promote the reaction, and antimony or the like to control the magnetic properties thereof. Such additives are described in detail in the specification of U.S. Pats. 2,885,365; 2,923,683; 2,923,684; 3,068,176; 2,923,685; 3,034,988; 3,078,147; 3,074,778; 3,117,093; 3,278,263; 3,243,260; 3,371,063, etc.

A pressure vessel called an autoclave is used for the high temperature/high pressure reaction described above. Severe conditions ensue because of the addition of water resulting in a strongly oxidizing atmosphere. Hence, the inner wall of the pressure vessel is attacked, and substances which are dissolved out of the vessel wall enter into the chromium dioxide product and tend to render the characteristics of the product unstable. On a laboratory scale, one can attempt to obviate such defects by using a platinum vessel. Such an expensive material, however, cannot be used for the production of tons of chromium dioxide as material for magnetic tape. It is therefore necessary to use an iron or iron alloy vessel, and the dissolving of iron from the vessel cannot be ignored.

SUMMARY OF THE INVENTION

It is therefore an object of the present invention to remove the above-mentioned defects encountered in the production of ferromagnetic chromium dioxide by providing a process for producing ferromagnetic chromium dioxide wherein a reaction vessel whose inner wall is made of chromium is used.

DETAILED DESCRIPTION OF THE INVENTION

The production of ferromagnetic chromium dioxide includes any process steps up to the conversion of a starting chromium compound to chromium dioxide, and any additional step which may be necessitated to pretreat at lower temperatures in a reaction vessel in which chromium dioxide is finally produced, as disclosed in U.S. Pat. 3,371,-043 or U.S. Ser. No. 11,035.

By the term "reaction vessel" is meant any vessel with which the starting materials or an intermediate chromium dioxide product comes into contact during tht production of chromium dioxide, and any vessel in which final chromium dioxide production is performed, which is subjected to conditions such that vessel erosion may occur. This problem is especially encountered in the high temperature/high pressure reaction in which final chromium dioxide production is performed.

The term "pressure vessel" includes the pressure vessel itself, an inner cylinder disposed in the pressure vessel intended to maintain the reaction mixture out of contact with the pressure vessel, or any process lines subjected to severe conditions. The present invention is essentially directed to cases in which the vessel or any process line is corroded by a strong chemical action such as high temperatures, hot water reaction, or oxidation, and not to vessels which are used at ordinary temperature and pressure, e.g., a vessel for holding dried chromic anhydride.

In order to provide the inner surface of such a vessel with chromium metal, the material obtained by applying a hard chromium plating onto the surface of an iron substrate is most preferably used. Obviously, the vessel itself may be made of a high purity chromium material, but such may prove unduly expensive. By covering the inner surface of the vessel with chromium, any chromium that may be dissolved from the wall of the vessel gives only a minimum effect in the presence of chromium ions which usually account for more than 90% of the reaction components. On the other hand, if metals other than chromium are used, almost all elements adversely affect the characteristics of chromium dioxide formed (e.g., refer to the specification of U.S. Pats. 2,885,365; 2,923,683; 2,923,684; 3,068,176; 2,923,685; 3,034,988, and 3,243,260, etc.). The present invention thus provides an extremely effective solution to the problem of producing stable ferromagnetic chromium dioxide. The purity level of the chromium lining in the present invention is more than 90% by weight based on the weight of the lining substances.

The following example will illustrate the effect of the present invention.

EXAMPLE

Chomic anhydride (800 g.), 10 g. of telluric acid, and 160 g. of water were uniformly mixed. The resultant mixture was transferred into a 2-liter autoclave made of stainless steel. The mixture was heated to 400° C. after pressurizing to an oxygen pressure of 100 atmospheres and maintained at this temperature for 10 hours. The inside pressure of the autoclave reached 310 atmospheres. After cooling to room temperature, the chromium dioxide formed was withdrawn. The product was designated as specimen A.

The same starting mixture as prepared above was transferred to an inner cylinder made of carbon steel, and the inner cylinder was placed in an autoclave. The mixture was treated under the same conditions as described above. The resultant product was designated as specimen B.

The same procedure as in the preparation of specimen B was repeated except that a 5μ thick hard chromium plating was applied to the surface of the carbon steel inner cylinder. The resulting product was designated as specimen C.

The impurities contained in each of the specimens A, B and C were analyzed by the fluorescent X-ray method. It was found that specimens A and B contained Fe in an amount of 0.2 to 1.07%. The Fe content was especially high at points in contact with the wall of the vessel, and decreased at points farther away from the wall of the vessel. The coercive force and the Curie point of the specimens were also influenced in relation to the iron content, and the distribution of the characteristics of the product as a whole became broader.

Specimen C however had a narrow distribution of the characteristics.

The results are given in the following table:

| Specimen | | Fe content (percent) | Curie point (° C.) | Coercive force (oersted) |
|---|---|---|---|---|
| A | Wall surface [1] | 0.6 | 125 | 360 |
| | Center [2] | 0.2 | 116 | 345 |
| B | Wall surface [1] | 1.0 | 135 | 370 |
| | Center [2] | 0.25 | 116 | 350 |
| C | Wall surface [1] | 0 | 116 | 345 |
| | Center [2] | 0 | 116 | 350 |

[1] The wall surface sample was obtained by cutting away the 2 mm. of chromium dioxide formed in contact with the inner surface of the vessel.

[2] The center sample was obtained by cutting away the center of the chromium dioxide in the inner cylinder, about 40 mm. away from the wall of the vessel.

As mentioned above, the critical feature of the present invention lies in coating the inner wall of the vessel with chromium corresponding to the chromium ions which are the predominant reaction component, which is performed to minimize the changes in the characteristics of the product due to the influence of impurities that are dissolved from the vessel during the production of chromium dioxide. Such a vessel is remarkably effective for the mass production of uniform chromium dioxide.

Although the present invention has been adequately described in the foregoing specification and the example included therein, it is readily apparent that various changes and modifications can be made without departing from the spirit and scope of the invention.

What is claimed is:

1. In a process for producing ferromagnetic chromium dioxide comprising thermally decomposing a hexavalent chromium compound or oxidizing a divalent or trivalent chromium compound and recovering product ferromagnetic chromium dioxide wherein foreign substances derived from the reaction vessel enter the product ferromagnetic chromium dioxide resulting in nonuniform properties, the improvement comprising producing ferromagnetic chromium dioxide having uniform properties by avoiding the introduction of adverse impurities from the reaction vessel by conducting the process in a reaction vessel, at least the inner wall of which consists of a material which is at least 90% by weight chromium.

2. The process of claim 1 wherein the pressure and temperature of said thermal decomposition or oxidation reaction are, respectively, greater than about 50 atmospheres and from 300 to 500° C.

3. The process of claim 2 wherein said hexavalent, divalent and trivalent chromium compounds are, respectively, chromic anhydride, chromium hydroxide and chromium oxide.

4. The process of claim 2 wherein water is present during said thermal decomposition or said oxidation reaction.

5. The process of claim 2 wherein said thermal decomposition or oxidation reaction is conducted in the presence of a member selected from the group consisting of tin tellurium, antimony, and platinum to produce a ferromagnetic chromium dioxide product having said member therein to improve the magnetic properties thereof.

6. The process of claim 2 wherein said reaction vessel comprises a vessel with which the starting materials or an intermediate chromium dioxide product comes into contact during said thermal decomposition or oxidation process.

7. The process of claim 2 wherein said reaction vessel comprises the vessel in which the reaction to produce said ferromagnetic chromium dioxide is performed.

8. The process of claim 2 wherein said reaction vessel comprises a metallic chromium-plated iron vessel.

References Cited

UNITED STATES PATENTS

| | | | |
|---|---|---|---|
| 3,575,689 | 4/1971 | Mihara et al. | 23—145 |
| 2,165,253 | 7/1939 | Graves | 23—290 |
| 3,268,103 | 8/1966 | Nelson | 23—290 |

OSCAR R. VERTIZ, Primary Examiner

H. S. MILLER, Assistant Examiner

U.S. Cl. X.R.

23—290; 252—62.51